April 12, 1927.

L. LYNDON ET AL 1,624,267

SYSTEM AND MEANS FOR DISPENSING FOODS AND COMMODITIES

Filed Aug. 16, 1924   3 Sheets-Sheet 1

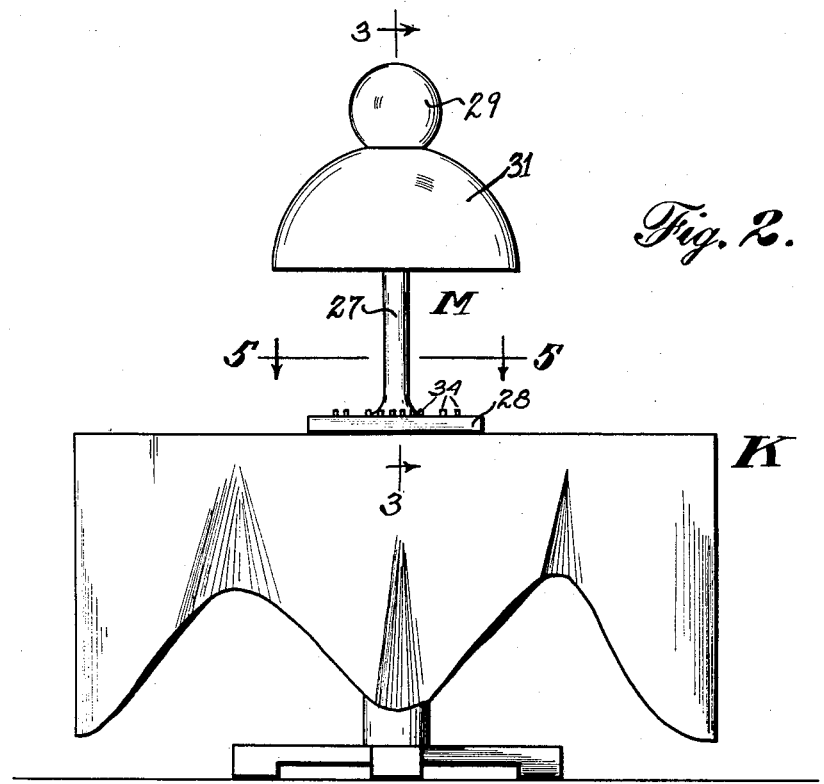
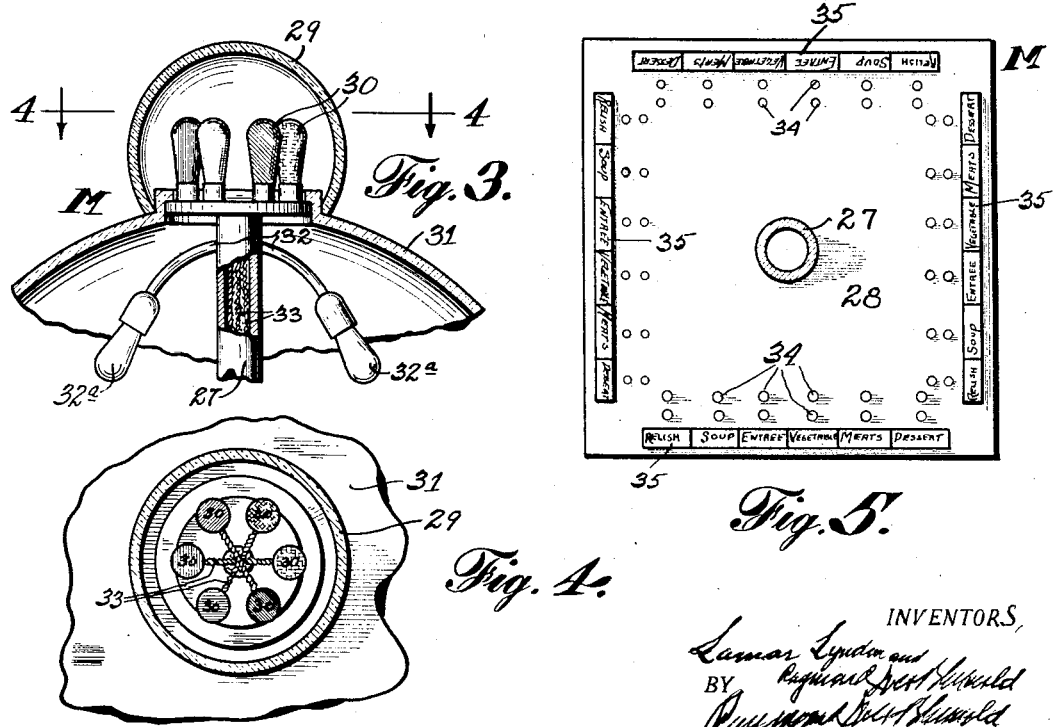

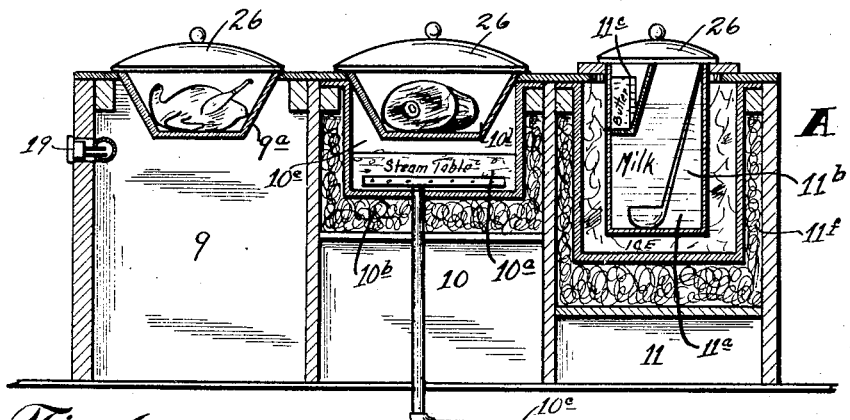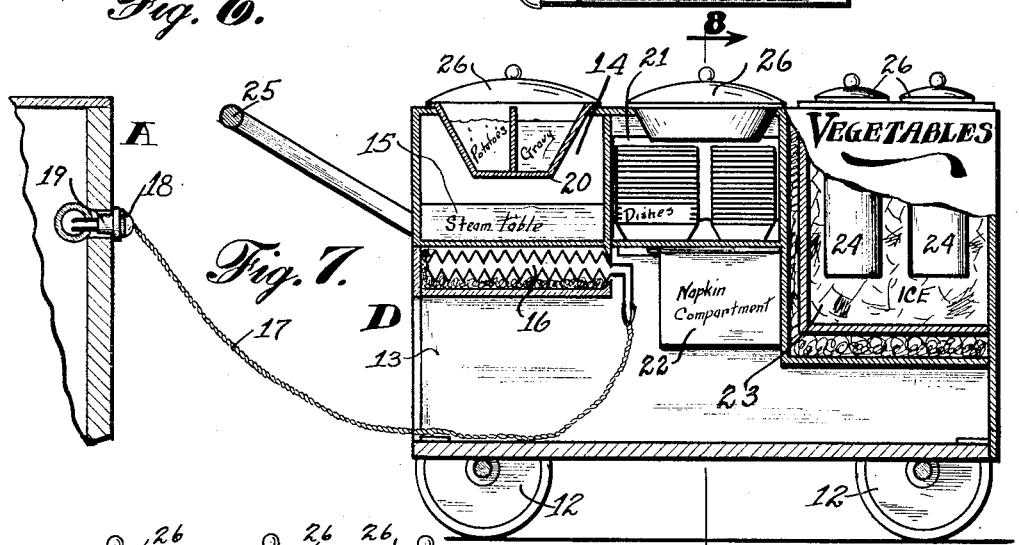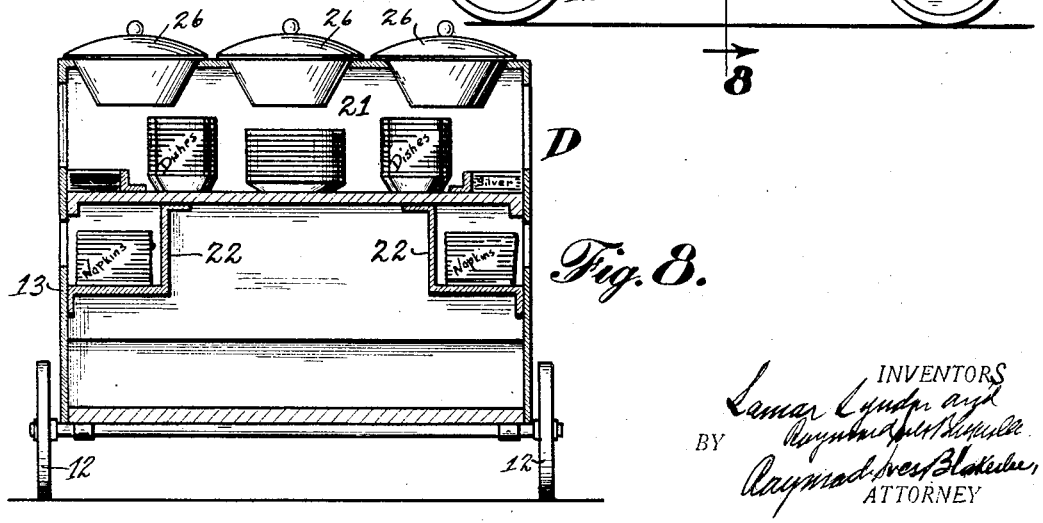

Patented Apr. 12, 1927.

1,624,267

UNITED STATES PATENT OFFICE.

LAMAR LYNDON, OF NEW YORK, N. Y., AND RAYMOND IVES BLAKESLEE, OF LOS ANGELES, CALIFORNIA.

SYSTEM AND MEANS FOR DISPENSING FOODS AND COMMODITIES.

Application filed August 16, 1924. Serial No. 732,533.

This invention relates to systems and means for dispensing foods and other commodities, and it has for its object to provide means of this character particularly pertinent to restaurant, cafe, club or hotel dining-room and cafeteria or other similar service, and whereby the various classifications or courses of foods and viands and edibles may be dispensed at dining tables subject to direct and particular choice and selection, of the diner or diners while seated at such table or tables. More particularly the invention concerns the separate dispensing of the separate classifications or courses of foods and viands at such table or tables subject to such choice and selection, so that foods for succeeding courses may be picked out by the diner or diners while seated, that is, the particular articles or portions of particular dishes may be so picked out and directly placed before the customer.

In ordinary cafeteria practice the customer selects foods or viands from different counters at different stations or at different stations or counters and places same upon a tray, which tray with its respective foods or courses is carried to the table for consumption. This practice is subject to the discomfort and labor of a more or less lengthy journey from counter to counter or station to station, accompanied by transportation of the tray with its increasing accumulation of foods and courses, the final burden of the tray with its dishes and contents being quite heavy, particularly for women and children or for persons lacking in physical robustness. The ordinary selection of foods from the menu, on the other hand, is devoid of the convenience and advantage of the immediate inspection and selection of the foods and courses which is possible in cafeteria practice. It is an object of the present invention to provide a system and means of dispensing foods and viands and courses of the same which will combine all the advantages and comforts of the ordinary method of serving and consuming of foods at tables by orders given from the menu to waiters, without an excursion to and past food-laden counters, with the advantages attaching to the direct inspection and selection methods and practices of cafeteria service.

In practicing the invention in one preferred method and embodiment, we provide a plurality of counters or steam tables or stationary dispensing departments or stations which are stocked and re-stocked with foods and viands segregated and classified in accordance with the various courses of meals, such as relishes, soups, meats or roasts, desserts and the like. Associated in service with each of these departments or stations, is a transfer vehicle or movable dispensing unit which is supplied from time to time from the corresponding unit or department of the stationary dispensing means. Both the stationary and movable units are properly equipped with means and instrumentalities for containing the respective foods and viands and maintaining proper temperatures of the same, and the movable units are provided with compartments, shelves, etc. for dishes, napkins, silverware and other table-ware and equipment, which table equipment may be supplied from any suitable and conveniently and suitably arranged department or unit, as for instance, a cabinet arranged adjacent to the stationary dispensing units or stations. Each of the tables, at which selection of the foods and courses is directly made by the customers and diners, from the respective vehicles or movable dispensing units, is preferably equipped with signaling means whereby the waiters or service people attending and serving the foods and viands may be notified to approach with their respective alimentary vehicles so that due and direct inspection and selection may be made by the customers. The edibles are of course to be conveniently arranged in stock with relation to the stationary dispensing units and adjacent zone or zones where the movable dispensing units are normally stationed, or stationed prior and subject to reception of signals to proceed to the dining tables. And the dining tables are of course suitably spaced apart by aisles and open interspaces so that the movable service units may have ready access to the dining tables and pass and re-pass each other and circulate and perform their excursions in passing to and from the tables and the said zone or zones they occupy when not in transit or responding to such signals. These signaling means may conveniently and effectively consist of banks of incandescent electric lamps supported upon the respective tables or a suitable standard or pedestal disposed upon the table, and energized by ordinary or suitable push button switches associated with the base of each such standard. Associated with such switches legend plates may be applied to each such base. The proper switches may thus be readily selected for signaling the proper movable transfer units to approach with their foods and tableware, napkins, etc. After a given table, or a customer at a given table, has been served by an attendant or waiter of the respective movable supply unit, either the customer or the waiter can operate the switch to render inoperative the signal previously set or given. This operation will proceed throughout the meal and the several courses thereof until all the wants and desires of the customer have been statisfied, and the plates, table-ware, equipment and the like, after use, are of course removed from the tables, either by bus boys or servants particularly employed for such purposes or by the waiters serving the successive courses from the movable dispensing units, who may take up the soiled or emptied dishes and table-ware employed by the customer in the immediate preceding course or courses, as he serves the next course and provides a table equipment for the same.

The present invention in its practice will also substantially, if not entirely, do away with, or tend to do away, with the present considerably objectionable practice and custom of feeing or tipping waiters and employees in eating places, inasmuch as no servants will be employed strictly as waiters, and the servants will be really dispensers of different courses. Also the final reckoning or bill, which may consist of the total calculated by charge slips or tickets deposited by each dispensing servant, for his course, as served, can be paid to a circulating collector, who can return the change, if desired, in sealed envelopes, from the cashier's desk, with the amount of purchase and charge in each instance stamped on the envelope, as a further safety factor in the delivering of correct change; and this envelope need not be opened until the collector leaves the table, avoiding the occasion of tipping him.

The invention has for further objects the provision of an improved method and improved means of the general character and nature stated, which will be superior in point of relative simplicity and inexpensiveness, compactness, neatness and attractiveness of display and arrangement, durability and efficiency and serviceability, in conjunction with increased convenience and efficiency in all pertinent respects and aspects.

With the above and other objects in view, the invention consists in the novel and useful provision, formation, arrangement, mode of operation and sequence and conjunction and association and combination of steps, acts, performances, parts, features, elements, structures and factors, all as hereinafter described, shown in the drawings and finally pointed out in claims.

In the drawings:

Figure 2 is a side elevation of one of the dining tables shown in Figure 1 upon an enlarged scale, the signaling means shown in Figure 5 for each table being likewise shown in side elevation;

Figure 3 is a still further enlarged fragmentary vertical sectional view, partly in elevation and partly broken away, of part of the signaling means shown in Figure 2, and taken on the line 3—3 of Figure 2 and looking in the direction of the appended arrows.

Figure 4 is a detail transverse horizontal sectional view taken upon the line 4—4 of Figure 3 and looking in the direction of the appended arrows;

Figure 5 is a detail transverse horizontal sectional view, taken upon the line 5—5 of Figure 2, and looking in the direction of the appended arrows, the same being upon an enlarged scale;

Figure 6 is a detail vertical transverse sectional view, partly in elevation, taken upon the line 6—6 of Figure 1, and looking in the direction of the appended arrows, the same being upon an enlarged scale;

Figure 7 is a view similar to Figure 6, and upon an enlarged scale, looking in the direction of the appended arrows, parts being in elevation and the same being partly fragmentary and taken upon the line 7—7 of Figure 1; and, Figure 8 is a detail vertical transverse sectional view taken upon the line 8—8, Figure 7, and looking in the direction of the appended arrows, parts being in elevation.

Corresponding parts in all the figures are designated by the same reference characters.

Figure 1:
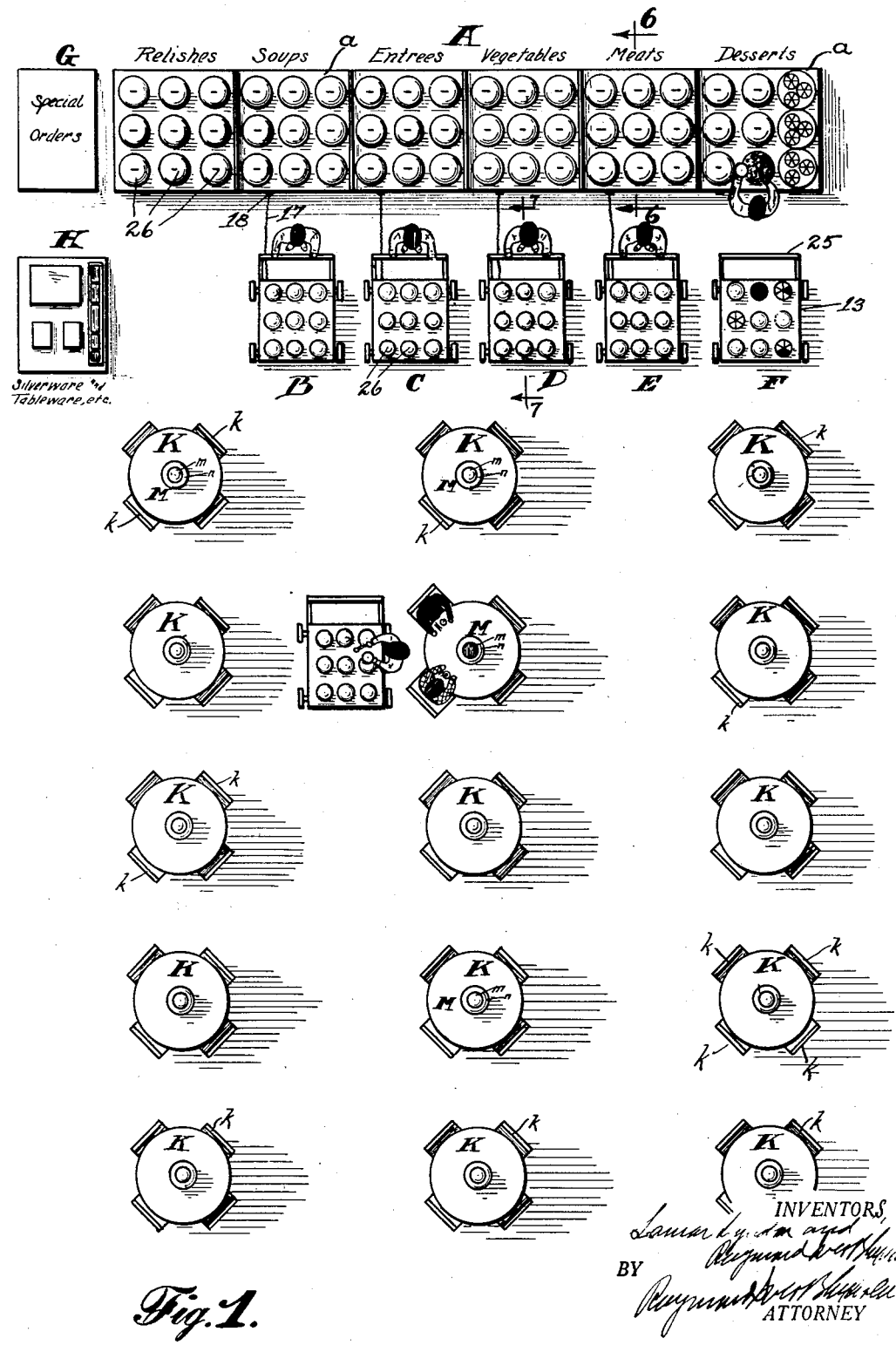
Figure 1 is a general plan view, partly diagrammatic, illustrating the construction, arrangement, disposition, and method of use and performance of the invention in one embodiment and mode of use and practice, diners and dispensing servants or waiters being likewise shown in positions incident to practice of the invention.

Referring with particularity to the drawings, we have designated generally at A a counter or stationary dispensing unit which is subdivided into or comprises a plurality of separate units or sub-units a, as to which are allocated the various classifications of foods and viands, for the several courses to be served and dispensed by the transfer or movable units B, C, D, E, and F, each of which is normally stationed adjacent the respective sub-unit a from which it serves and from which it is restocked from time to time with the respective classification of edibles. At G is shown a special order counter, so indicated, where may be stationed one or more servants who can be signalled to approach a given table and take special orders for planked steaks, fish dishes and other dishes not frequently served by the specially organized and dispensing sub-units. These special orders may be then given from this counter to the chef or head cook who likewise supplies the main or stationary dispensing unit A. A cabinet H may also be provided as a general supply station for tableware, linen, etc., and the counter G and cabinet H will be specially arranged in convenient position with relation to the unit A and the movable dispensing units. K designates in each instance a table for customers and patrons, each being of course provided with a proper number of chairs $k$, and these tables and chairs may be disposed in the restaurant or dining room or other eating house in accordance with preference or convenience, the relative disposition thereof providing for the free and convenient circulation of the transfer units. M designates combined signalling and lighting means, $m$ designating the signalling element or elements thereof, and $n$ designating the lighting element or elements, and such means M is or are preferably provided for each of the tables K, whereby the patrons or customers of each such table may conveniently set a proper signal to be responded to by the servants assigned to the separate movable dispensing units or by those assigned to the special order counter G. It will be understood of course that such signalling means as an element and feature of the system and means constituting the invention, may be widely varied in character, or in fact, may be omitted and the attention of the proper servants directed to the respective tables in any suitable or convenient manner either by the customers and diners themselves or through the agency of a head waiter or his assistants or in any other manner; or, obviously, the signals may be located in juxtaposition to the stationary dispensing units A or the transporting units adjacent thereto. Such signalling factor is not a necessary element or feature in the operation and utilization of the invention in its broadest aspects. Also, it will be understood that any equivalent or substitute means of separate transfer and transportation of dishes or courses may be employed in place and stead of the movable dispensing units shown in the drawings, and any satisfactory and preferred or equivalent organization of the stationary dispensing unit A and its sub-units may likewise be substituted for that shown in the drawings.

One of the sub-units $a$ is illustrated in detail in Figure 6, and is shown in such form to include a plurality of compartments 9, 10, and 11 in the first of which is accommodated a deep receptacle $9^a$ within which one or more roast fowl, for instance, may be provided, either intact or in unjointed or sliced form for service by selection, for re-stocking the transfer unit E. Similarly, the next compartment 10 is provided with a steam table $10^a$ surrounded by a heat-insulating jacket $10^b$ and served by a steam pipe $10^c$, a deep receptacle $10^d$ being received within a heated chamber $10^e$ and containing a roasted joint. The compartment 11 may be provided with a similarly accommodated ice-surrounded container or receptacle $11^a$ subdivided to provide a compartment $11^b$ to contain milk, and a further compartment $11^c$ to contain butter; a similar heat-insulating jacket $11^f$ being provided for such iced container. Each of the other sub-stations $a$ may be similarly and appropriately equipped and organized to contain temporarily the particular classification of foods or viands with which the allocated transfer unit is to be re-stocked from time to time. The said transfer units B, C, D, E and F comprise vehicles of any preferred frame structure and equipped with soft-tired wheels 12 to promote noiseless traction, and the body 13 of each such vehicle may be sub-divided into compartments, the vegetable vehicular unit D, as shown in detail in Figures 7 and 8 being provided with a compartment 14 having a steam table 15 heated by an electrical unit 16 served by a flexible cord 17 provided with a plug 18 which may be inserted within a base-board or wall receptacle 19 installed at the front of the respective sub-unit $a$ so that heat units may be imparted to the steam table while the unit D is idle and awaiting signals. Into this compartment 14 may be set a deep receptacle 20 subdivided to separately contain gravy and potatoes, for instance. A still further receptacle or compartment 21 may be provided for dishes, a still further compartment 22 for napkins and tableware, and a still further heat-insulated iced compartment 23 provided with containers 24 for vegetables of various kinds. Each of the vehicles is provided with a push rail or hand rail 25 whereby the servant or attendant may manipulate it to and from a table to be served.

Of course all of the various receptacles and dishes and such further containers and receptacles as may be required for a sufficiently and universally dispensing the various classifications of viands, are provided with covers such as 26; and such further and necessary or convenient adjuncts and features as may be preferred or required, and as will readily suggest themselves, may be added to the several types and kinds of features indicated in the drawings as pertinent to proper equipment of the unit A and the movable units B to F inclusive.

The signalling means M in the form shown in the drawings may comprise a lamp standard 27 with a broad base 28, to be disposed centrally of the respective table, such lamp standard supporting a dome 29 within which are disposed and suitably socketed a plurality of vari-colored incandescent lamps 30, each of which when energized will give a corresponding color glow to such dome 29, so that a clear and impressive signal will be set observable by the attendant or servant, the service of whose transfer unit is desired. Below this dome 29 may be provided a lamp shade 31 within which an electrolier 32 may be disposed, supported by the standard 27, and having incandescent bulbs 32ª, circuit wires 33 being provided within the standard 27, which may be hollow and serve as a conduit for such purpose, such circuit wires being connected up in any suitable manner with the electrical service of the room. In a suitable and obvious manner each of the incandescent lamps 30 may be connected up with a separate electrical switch having push buttons 34, so that the respective lamp may be energized and deenergized; and upon the base 28 of such standard 27, a plurality of such switches may be provided, conveniently accessible to the several patrons grouped about the table, and each switch may be provided with an adjacent legend plate 35 upon which may be stamped or imprinted or otherwise displayed the name of the particular course or classification of foods, the signal for the supply of which from one of the units B to F is to be set or discontinued by the allocated switch 34.

The operation method of use and carrying into effect and service of the invention in the embodiment disclosed in the drawings and heretofore described will be obvious from such foregoing description, taken in conjunction with the accompanying drawings, and in the light of the preliminary discussion preceding the detailed description herein. A patron or patrons such as indicated to be seated at one of the tables in Figure 1 desiring to commence the meal with soup will simply press the appropriate button opposite the soup legend, nearest him, the corresponding lamp 30 will be energized and the dome 29 caused to similarly glow, and the servant whose duty it is to answer such signals, will then approach with his previously stocked unit B or the like, and the patron will have an opportunity to select from his stock of soups the particular kind and quality which he prefers, small sampling plates or cups or the like being provided to permit him to make selection upon sampling, if he so prefers, and this same provision may be made as to each of the transfer units. To this end paper receptacles may effectively be provided and used and each of the units B to F may be provided with a receptacle for such used devices. When a course has been selected and served by the attendant either the attendant or the patron may press the de-energizing button of the respective switch 34 (or a single main de-energizing button may obviously be provided for each table), the attendant departs with his movable supply unit, and after the patron has completed the respective course he sets the next appropriate signal, such as that for entrees, the respective and appropriate unit, C, approaches, that course is served, the signal is withdrawn, and so on through the consecutive serving of the respective courses and selected dishes.

Thereafter, the patron required to pay for the meal may set an appropriate signal, not shown in the drawings, but the provision of which will be obvious, and which may be known as the collector's signal, and a collector will approach, take up the checks or charge slips left by the various dispensers and kept in a suitable compartment in each of the movable units, receive the pay from the patron and return the charge, if any there be, from the cashier's desk, preferably in a sealed envelope, as previously stated, with the amount of the bill or amounts of money handed the collector and the amount of the change resulting from the transaction, all stamped on such envelope.

The patron then departs without the necessity of repairing to a cashier's desk.

Without any particular and specific illustration or description thereof, it will be seen that the system and means constituting the present invention may be readily varied and modified or elaborated to provide for the exposition of various wares of classified kinds, to purchasers in a given store, and with tables or stations to which customers and patrons may repair, and at which they may be seated for refreshment, or for rest; so that in a grocery store for instance, a patron can take a comfortable seat and set a signal for a movable display unit, the attendant serving which may approach and display to the customer the wares assigned to him for sale. This is but one further adaptation of many which may suggest themselves as possible in the development and elaboration and modification of the invention and its employment and application.

It is obvious that many variations and changes and departures may be provided and resorted to, with respect to the foregoing description, and the particular showings of the drawings, in adapting the invention to various conditions of use and service, without departing from the true spirit of the invention.

Having thus disclosed our invention, we claim and desire to secure by Letters Patent:

1. The improved method of service to customers at one or more points in an establishment, of wares to be selected accompanied by inspection, consisting in providing a plurality of movable conveying and displaying units each stocked with certain wares, and a main dispensing unit for re-stocking such display units, whereby attendants assigned to such respective display units may upon receipt of notice or signal repair to such point or points and permit selection and purchase thereat.

2. The improved method of dispensing foods consisting in providing an eating place with a plurality of tables for patrons, in providing a plurality of transfer units and attendants therefor each designated and adapted to convey a selected classification of foods to any such table, and in further providing a main unit from which such transfer units may be re-stocked; there being further provided suitable signaling means to be operated for the purpose of directing to the respective tables the respective transfer units.

3. The improved method of service to customers at one or more points in an establishment, of wares to be selected accompanied by inspection, consisting in providing a plurality of movable conveying and displaying units each stocked with certain wares, and a main dispensing unit for re-stocking such display units, whereby attendants assigned to such respective display units may upon receipt of notice or signal repair to such point or points and permit selection and purchase thereat; there being further provided suitable signalling means for directing to such points such respective display units.

4. The combination and association, with a plurality of tables, of a plurality of movable units respectively adapted to transport to such tables various classes of wares, and a main unit for re-stocking such movable units; signalling means being provided whereby such movable units may be given notice respectively to repair to such tables.

5. The combination and association, with a plurality of tables, of a plurality of movable units respectively adapted to transport to such tables various classes of wares; signalling means being provided whereby such movable units may be given notice respectively to repair to such tables.

6. The improved method of dispensing foods consisting in providing an eating place with a plurality of tables for patrons, and in providing a plurality of transfer units and attendants therefor each designated and adapted to convey a selected classification of foods to any such table; there being further provided suitable signalling means to be operated for the purpose of directing to the respective tables the respective transfer units.

7. The improved method of service to customers at one or more points in an establishment, of wares to be selected accompanied by inspection, consisting in providing a plurality of movable conveying and displaying units each stocked with certain wares, whereby attendants assigned to such respective display units may upon receipt of notice or signal repair to such point or points and permit selection and purchase thereat; there being further provided suitable signalling means for directing to such points such respective display units.

8. The combination and association, with a plurality of points or stations for the display and selection of wares, of a plurality of movable units respectively adapted to transport thereto various classes of wares; signalling means being provided whereby such movable units may be given notice respectively to repair to such points or stations.

9. The combination and association, with a plurality of points or stations for the display and selection of wares, of a plurality of movable units respectively adapted to transport thereto various classes of wares; signalling means being provided whereby such movable units may be given notice respectively to repair to such points or stations, and a main unit for re-stocking such movable units.

10. In a restaurant, a plurality of tables for patrons, a plurality of vehicles for respectively supplying foods for inspection and selection at such tables, and a main unit from which such vehicles may be re-stocked; there being further provided suitable signalling means to be operated for the purpose of directing to the respective tables said vehicles.

11. In a restaurant, a plurality of tables for patrons, and a plurality of vehicles for respectively supplying foods for inspection and selection at such tables; signalling means being further provided to be operated for the purpose of directing to the respective tables the respective vehicles.

In testimony whereof, we have signed our names to this specification.

LAMAR LYNDON.
RAYMOND IVES BLAKESLEE.